Nov. 8, 1938.    T. J. ELLIS    2,135,569
RUBBER VALVE STEM FOR INFLATABLE ARTICLES
Filed Dec. 15, 1934

INVENTOR
THARON J. ELLIS
BY
Albert L. Ely
ATTORNEY

Patented Nov. 8, 1938

2,135,569

UNITED STATES PATENT OFFICE 2,135,569

RUBBER VALVE STEM FOR INFLATABLE ARTICLES

Tharon J. Ellis, Akron, Ohio, assignor, by mesne assignments, to The Dill Manufacturing Company, Cleveland, Ohio, a corporation of Ohio Application December 15, 1934, Serial No. 757,660

1 Claim. (Cl. 152—430)

This invention relates to valve stems for inflatable articles such as inner tubes for pneumatic tires and the like, and more especially it relates to rubber valve stems of the character mentioned that have metal inserts, such as a valve tube, molded thereinto.

The chief objects of the invention are to facilitate the manufacture of the valve stems; to prevent the flow of rubber onto normally exposed portions of the inserts, during molding of the valve stem; to obviate the necessity for buffing the vulcanized rubber valve stem to remove overflow rubber from the exposed portion of the insert; and to secure accuracy of construction in the finished product. Other objects will be manifest as the specification proceeds.

Figure 1:
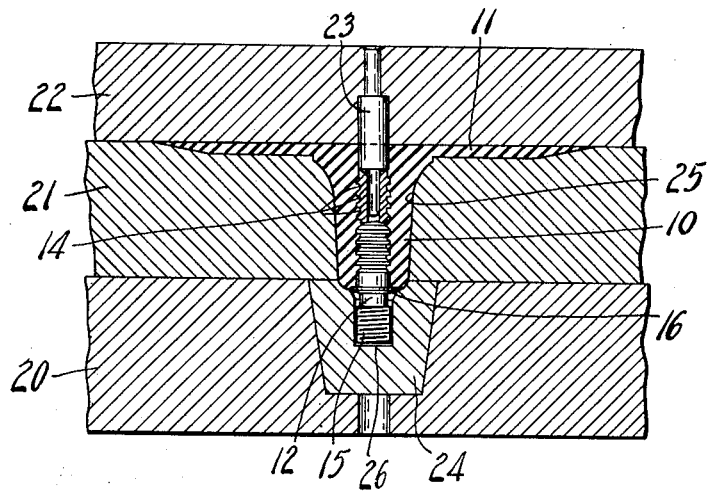
Figure 1 is a fragmentary sectional view through a sectional vulcanizing mold, and the improved valve stem, in section therein.
Figure 2:
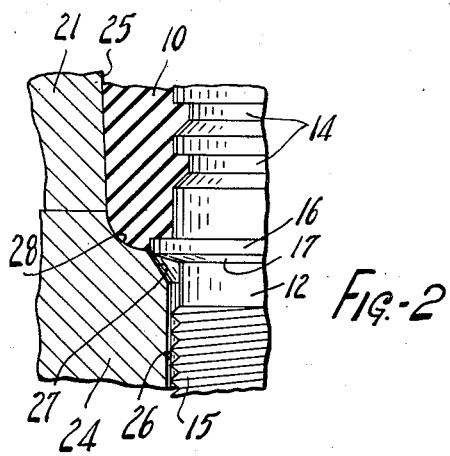
Figure 2 is a detail view, on a larger scale, of a portion of the mold and work shown in Figure 1.
Figure 3:
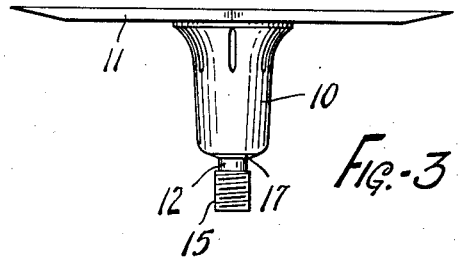
Figure 3 is a side elevation of the finished valve stem.

Referring to the drawing, 10 is a rubber valve stem structure that is formed with the usual base flange 11 to facilitate its incorporation in the wall of an inflatable rubber article, such as an inner tube, and 12 is a tubular metal insert or valve tube that is molded axially into the stem structure and which contains the usual valve mechanism (not shown). The valve tube has one end portion formed exteriorly with a plurality of circumferential grooves 14, 14, this portion of the insert being molded into the stem structure 10 whereby the grooves 14 are filled with rubber, thus effecting a mechanical interlock of the metal and rubber to supplement the adhesion therebetween. The opposite end portion of the insert projects from the end of the stem structure and is formed with a male screw thread 15 to receive the usual valve cap (not shown). Intermediate the grooves 14 and screw threads 15 the insert is formed with a radially extending circumferential flange 16 having its lateral face nearest the said screw threads slightly beveled or tapered as shown at 17. The rubber at the end of the stem structure 10 overlies the peripheral face of flange 16 and is substantially flush with the tapered face 17 thereof.

The improved valve stem is molded and vulcanized in a sectional mold shown most clearly in Figure 1, said mold comprising a base plate 20, an intermediate plate 21, a cover plate 22, a mandrel and registering pin 23 mounted in said cover plate, and a socket member 24 mounted in said base plate 20 flush with the top thereof. The intermediate plate 21 is formed with a molding cavity 25 in which the major portion of the stem structure 10 is molded.

The socket member 24, which is in axial alignment with cavity 25, is formed with an axial recess 26 adapted to receive the threaded end portion of the valve tube 12, said recess being tapered or countersunk at its upper end, as at 27, to receive the flange 16 of the said valve tube. The large end of countersink 27 opens into a shallow cavity 28 in the socket member, said cavity being contiguous with and constituting a continuation of molding cavity 25.

In the manufacture of the improved valve stem, when the valve tube 12 is mounted in the mold its flange 16 seats itself in the large end of the countersink 27 of socket member 24, the said tube being held in upright position by the mandrel and registering pin 23 which extends into its axial bore from the upper end thereof. The arrangement is such that the plastic rubber composition in the molding cavity of the mold may flow about and cover the peripheral surface of the tube flange 16, yet the latter will so nicely seat in the countersink 27 as to prevent the rubber from flowing past said flange, even though there may be small variations in the diameter of the flanges of the valve tubes.

The invention prevents the flow of rubber onto the threaded end of the valve tubes so that buffing thereof is not required, and it achieves the other advantages set out in the foregoing statement of objects.

Modification may be resorted to without departing from the spirit of the invention or the scope of the appended claim.

What is claimed is:

A rubber valve stem for inflatable articles comprising a rubber valve base flange, a rubber sleeve projecting from said flange, a metal valve tube vulcanized in said sleeve and having a portion projecting therefrom, a shoulder being formed at the junction of the sleeve and the portion of the tube projecting therefrom, and a ledge on said tube forming at least a portion of the exterior surface of said shoulder.

THARON J. ELLIS.